United States Patent [19]

Boerner

[11] Patent Number: 5,148,731
[45] Date of Patent: Sep. 22, 1992

[54] DEVICE FOR CUTTING FRUIT, VEGETABLES OR THE LIKE INTO SLICES

[76] Inventor: Juergen Boerner, Neustrasse, 5565 Niederkail, Fed. Rep. of Germany

[21] Appl. No.: 815,537

[22] Filed: Dec. 26, 1991

Related U.S. Application Data

[63] Continuation of Ser. No. 562,250, Aug. 3, 1990, abandoned.

[30] Foreign Application Priority Data

Aug. 5, 1989 [DE] Fed. Rep. of Germany ....... 3926013

[51] Int. Cl.⁵ .............................................. B26D 1/02
[52] U.S. Cl. .................... 83/85.7; 30/279.6; 83/932; 99/537
[58] Field of Search ................. 83/856, 857, 932, 704, 83/708; 99/537, 538; 30/287, 279.6, 279.2

[56] References Cited

U.S. PATENT DOCUMENTS

| 161,920 | 4/1875 | Witmer | 83/857 |
| 4,212,431 | 7/1980 | Doyel | 83/857 X |
| 4,290,196 | 9/1981 | Börner | 30/279.6 X |
| 4,733,588 | 3/1988 | Yamamoto | 83/857 |
| 4,733,589 | 3/1988 | Wolff | 30/279.2 X |

FOREIGN PATENT DOCUMENTS 6608205 7/1971 Fed. Rep. of Germany .
3500959 1/1987 Fed. Rep. of Germany .

Primary Examiner—Frank T. Yost
Assistant Examiner—Kenneth E. Peterson
Attorney, Agent, or Firm—Hill, Van Santen, Steadman & Simpson

[57] ABSTRACT

The invention is directed to a device for cutting fruit, vegetables or the like into slices, comprising a blade-holding plate at whose leading edge a V-shaped cutter blade is arranged, comprising two framing ledges arranged essentially parallel that are connected to one another by the blade-holding plate and by at least one further transverse web, and comprising a slide plate guided at the framing ledges and introducible parallel to the blade-holding plate, whereby a narrow gap remains between the back edge of the slide plate and the cutter blade. It is inventively provided that a support plate (11) fashioned as a closed surface is arranged under the slide plate (6) in order to increase the stability of the slide plate, particularly to counter sagging when pressure is exerted on the material to be cut.

19 Claims, 3 Drawing Sheets

DEVICE FOR CUTTING FRUIT, VEGETABLES OR THE LIKE INTO SLICES

This is a continuation of application Ser. No. 562,250, filed Aug. 3, 1990, now abandoned.

The invention is directed to a device for cutting fruit, vegetables or the like into slices, comprises a blade-holding plate at whose leading edge a V-shaped cutter blade is arranged; comprises two framing ledges arranged essentially parallel that are connected to one another by the blade-holding plate and by at least one further transverse web; and comprises a slide plate guided at the framing ledges and introducible parallel to the blade-holding plate, whereby a narrow gap remains between the trailing edge of the slide plate and the cutter blade.

Figure 1:
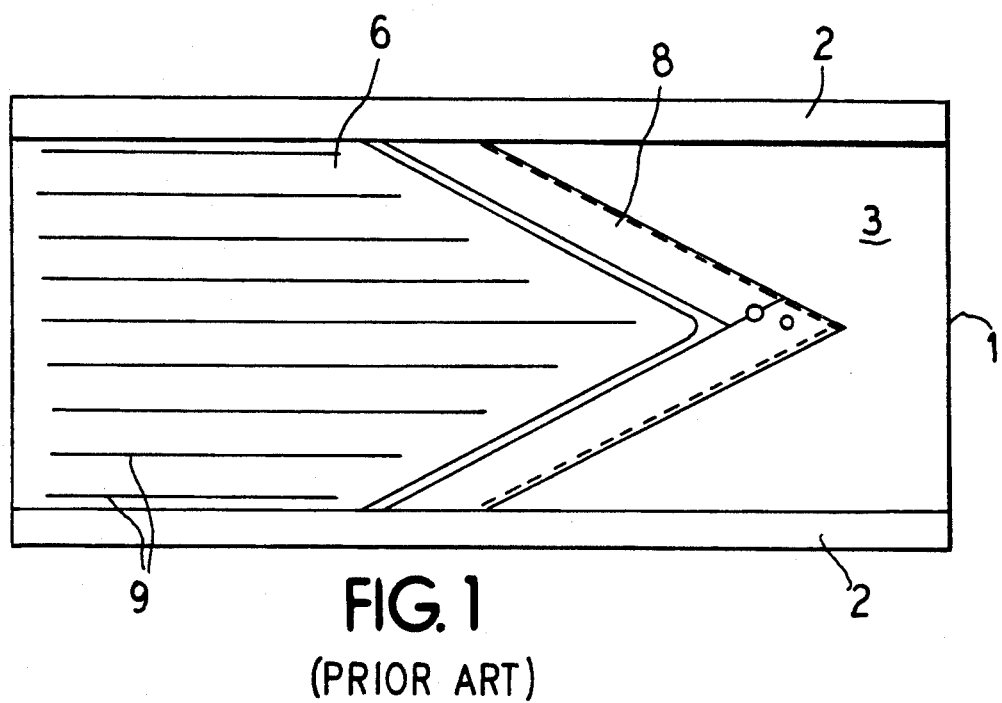

Such a device is disclosed, for example, by EP 0 306 017 A2. The prior art on the basis whereof the present invention departs is shown in the drawings with reference to FIGS. 1 and 2 which schematically show a device conforming to the preamble of claim 1 of a type already distributed for some time by the applicant. FIG. 1 thereby shows the corresponding device having introduced slide plate, whereas FIG. 2 shows the same device with the slide plate removed.

Figure 2:
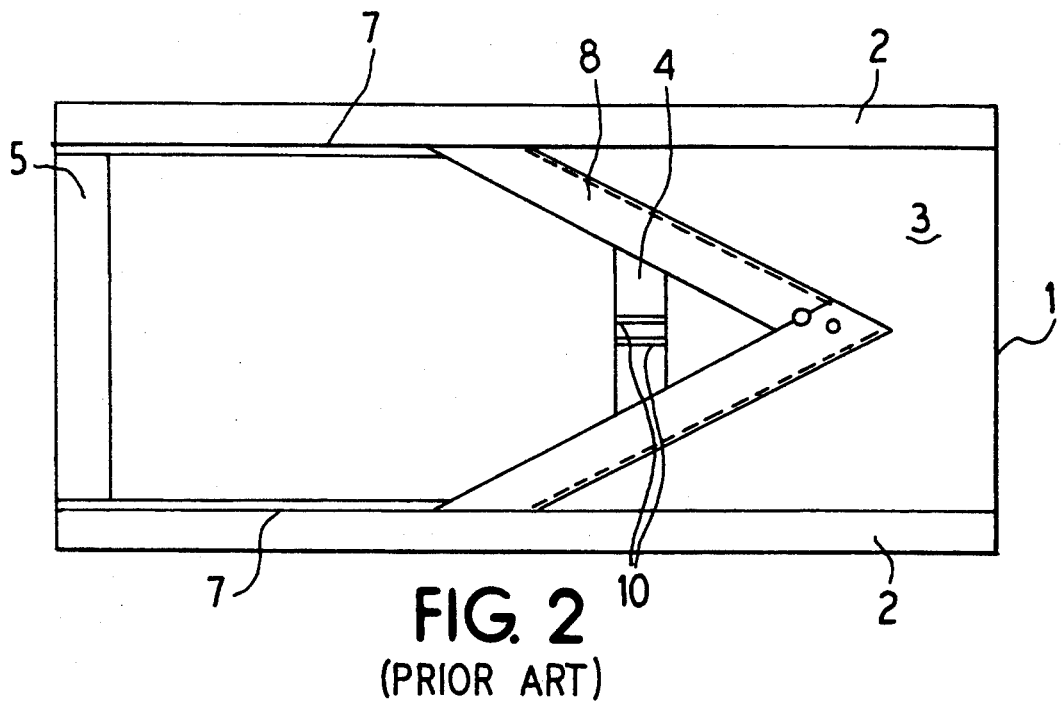

As shown in FIG. 2, the known device 1 comprises two framing ledges two that are connected to one another in their back part by a blade-holding plate 3 and are connected to one another in their front part by two transverse webs 4 and 5 arranged at the underside of the device. A slide plate 6 arranged parallel to the blade-holding plate 3 is insertable in the front part of the device 1 (as shown in FIG. 1), this slide plate 6 being guided in a lateral groove or on a lateral guide ledge 7 in or at the framing ledges 2 and being arranged such in its locked condition that a narrow gap remains between the trailing edge of the slide plate 6 and a cutter blade 8 that is secured to the leading edge of the blade-holding plate 3. The slide plate 6 on which the article to be cut is guided comprises longitudinal fluting 9 additionally provided for this purpose. Upon insertion, the slide plate 6 is additionally guided with a centrally arranged longitudinal flute in a guide groove 10 (FIG. 2) on the transverse web 4.

The known device is disadvantageous insofar as the slide plate sags when pressure is exerted on the article to be cut and thereby deforms over the long-term or can even break in the extreme case.

It is therefore the object of the invention to improve the known device to such effect that a sagging of the slide plate is no longer possible when pressure is exerted on the article to be cut and, thus, to improve the functionability and service life of the device overall.

This object is inventively achieved in that a supporting plate fashioned as a closed surface is arranged under the slide plate. The slide plate is thereby lent considerably greater stability vis-a-vis sagging when pressure is exerted on articles to be cut. Over and above this, the slide plate can be more easily placed into the device due to the improved guidance upon insertion.

In a preferred embodiment of the invention, the support plate has essentially the same shape as the slide plate. A largely full-surface support of the slide plate from below is possible on the basis of this design.

The invention further proposes that the back edges of the support plate that proceed parallel to the cutter blade spring slightly back behind the corresponding edges of the slide plate. It is easier for the cut material to thereby drop through.

The invention proposes that the slide plate comprises at least one centrally arranged longitudinal rib that presses against the support plate. An adequate support of the slide plate in downward direction can be achieved in this way without requiring a surface-wide contact between the slide plate and support plate which would make the introduction of the slide plate more difficult.

The invention further proposes that the slide plate has appropriate noses at its underside engaging into notches that are fashioned in guide ledges that adjoin the framing ledges and the support plate. The slide plate can thus be prevented from unintentionally sliding out, which could occur particularly easily when the material to be cut is pulled back. The lock-in effect is further intensified during cutting since pressure is thereby exerted on the slide plate.

It is thereby especially preferred that a projection at at least one framing ledge directly following the back end of the guide edges is arranged such above the plane of the slide plate that the slide plate is placed under a bending stress due to the guidance of this projection and the simultaneous lifting in its front part as a result of the noses at its underside sliding onto the front regions of the guide ledge, this bending stress in turn easing at the engagement of said noses at the underside thereof into the notches. The securing of the slide plate against unintentionally sliding out is further improved on the basis of this arrangement since the removal of the slide plate can ensue only against [the force of] the said bending stress.

A guide groove for the centrally arranged longitudinal rib is provided at the back end of the support plate in a preferred embodiment of the invention. This additionally facilitates the guidance of the slide plate upon insertion and increases its overall stability.

The invention further proposes that the back end of the support plate is supported on an angled profile attached to the framing ledges and to the blade-holding plate, increased stability in this region deriving as a result thereof and the bending moment being improved.

It is provided in a further of the invention that a transverse web residing perpendicularly relative to the underside of the support plate is arranged at said underside, this transverse web extending from one frame side to the other and likewise resulting in a further increase in the stability.

The invention further proposes that a holding grip in the form of a downwardly offset step for supporting the ball of the hand holding the device is arranged at the front end of the frame. It is thereby especially advantageous when the transverse web is arranged relative to the holding grip in an ergonomically meaningful distance for the fingers of the hand holding the device. As a result of this design of the holding grip adapted to the shape of a hand, the device can be firmly and securely grasped. Since the hand thereby grasps only at the back side of the device, the slide surface remains completely free and its entire seating surface can therefore be used for the actual cutting process.

In a preferred embodiment of the invention, the transverse web is fashioned in the form of an angled profile having three through four corrugations. The gripping flutings thereby formed allow an easier and safer engagement of the fingers, as a result whereof the device can also be securely held in various positions with one hand.

Finally, the invention proposes that the slide plate has its front end provided with a gripping edge. It is thereby especially advantageous when the upper side of the holding grip has a gripping depression that is preferably essentially symmetrically fashioned and centrally arranged in the holding grip. Overall, this arrangement facilitates the removal of the slide plate from the latch-in mount.

In summary, it can thus be stated that the inventively proposed measures make a device of the species available wherein the stability of the slide plate has been noticeably improved particularly vis-a-vis sagging. Lateral edge extensions of the slide plate and correspondingly lengthened guide ledges and grooves at the framing ledges—as required in the previous slide —thus becomes superfluous because, of course, the stability is already guaranteed by the seating of the slide on the support plate. At the same time, the holding grip design of the invention means that the device can be firmly and reliably grasped and that the slide surface remains free of the grasping hand.

Further features and advantages of the invention derive from the following description of an exemplary embodiment that is set forth in greater detail with reference to the attached drawings. Thereby shown are:

FIG. 1—The known prior art.

FIG. 2—The known prior art without the slide plate.

Figure 3:
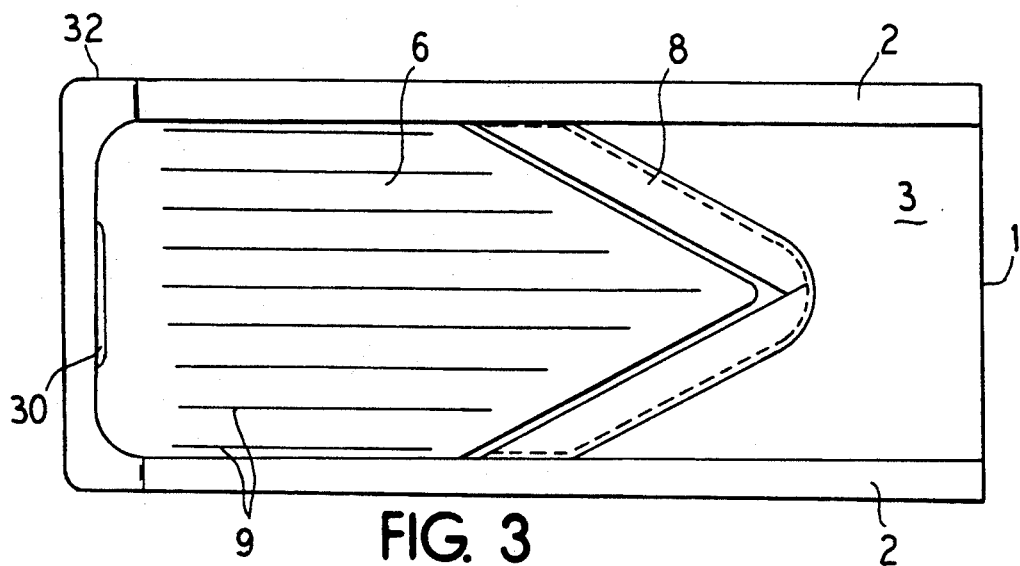
Figure 4:
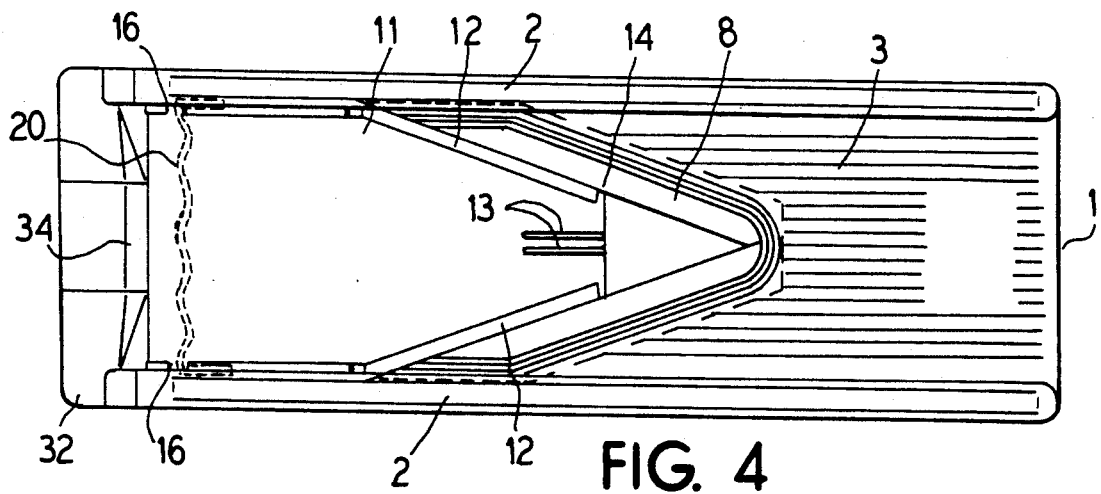
Figure 5:
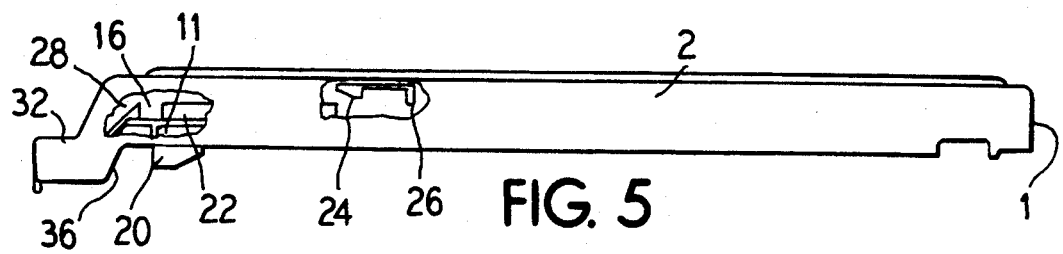
Figure 6:
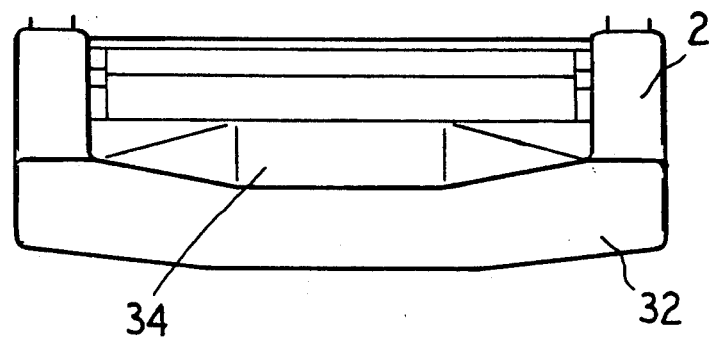

FIG. 3—a schematic illustration of the device of the invention with slide plate introduced;

FIG. 4—a more detailed plan view onto the device of the invention without slide plate; and FIG. 5—a side view of FIG. 4, whereby regions of the framing ledges are recessed at some locations;

FIG. 6—the holding grip design of the invention shown in a front view; and

Figure 7:
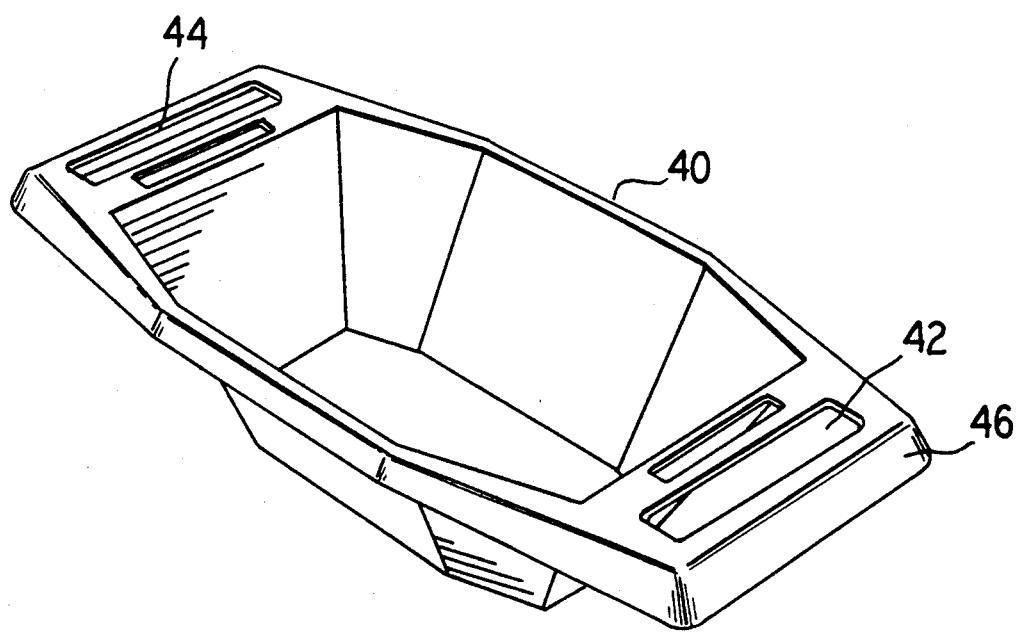

FIG. 7—a collecting bowl that can be employed in conjunction with the device of the invention.

The device of the invention is referenced with reference character 1 overall in the schematic illustration of FIG. 3. The device 1 essentially comprises two framing ledges 2 that are held together in their back part (at the right) in the drawing by a blade-holding plate 3 at whose V-shaped leading ledge a cutter blade 8 is secured. In complimentary shaping, the device is completed by a slide plate 6 that is arranged such in its engaged condition that a narrow gap through which the cut material can drop remains between its back edge and the cutter blade 8. A gripping edge 30 of the slide plate 6 as well as a holding grip 32 of the frame design arranged there below may be seen at the front end of the device (at the left in the drawing). Longitudinal flutes 9 for guiding the material to be cut proceed on the slide plate 6 itself.

The more detailed illustration of the device 1 of the invention in FIG. 4 particularly shows details of a support plate 11 of the invention. The shape thereof essentially corresponds to that of the slide plate 6 with the exception of the back point. As already mentioned above, the support plate 11 has its back end provided with a guide groove 13 for engagement with a centrally arranged longitudinal rib of the slide plate 6 and is supported on an angled profile 14 attached to the lateral framing ledges 2 and to the underside of the blade-holding plate 3. A corrugated transverse web 20 in the form of an angled profile residing perpendicularly on the support plate at the underside thereof and provided for increasing stability may be seen in the front region of the support plate 11 (indicated with broken lines), this transverse web 20 simultaneously making gripping flutes for the fingers of the grasping hand available. The transverse web 20 serving as gripping ledge is thereby arranged at an ergonomically meaningful distance from the holding grip 32 (for example, four through six cm from the front edge thereof). In order to make it easier to remove the slide plate from the device, a gripping depression 34 is provided at the holding grip 32 of the frame structure in congruency with the gripping edge 30 of the slide plate 6, this gripping depression 34 being shown again in FIG. 6 in a different view.

The lateral guidance of the slide plate as well as the means of the invention provided for the engagement thereof can be seen best with reference to FIG. 5. A guide ledge 22 for the slide plate 6 that is arranged at the framing ledge 2 and on the support plate 14 may be seen in the recess of this figure shown at the left in the drawing. Notches 16 are provided in the guide ledge 22 at the front region thereof and in coincidence with corresponding noses (not shown) at the underside of the slide plate 6, said noses engaging into said notches 16. The lateral edges of the slide plate 6 that proceed parallel to the framing ledges 2 are then guided in upward direction by a projection 24 at every framing ledge 2, as may be seen with reference to the recess in FIG. 5 shown at the right of the drawing, whereby the guide ledge 22 ends immediately there before. The projection 24 is thereby arranged such that said noses at the underside of the slide plate glide onto the front regions 28 of the guide ledge 22 at the moment wherein the lateral edge of the slide plate 6 comes into contact with said projection 24 and is thereby held in upward direction. A slide plate 6 is thereby placed under a slight bending stress that in turn eases as soon as said noses have ultimately engaged into the notches 16. The engagement thus ensues upon overcoming a pressure point and therefore ensues with a noticeable snap-in noise that indicates to the user that the slide plate 6 is firmly seated. By the same time, this arrangement also guarantees a firm seat of the slide plate 6 during use of the device of the invention since the removal of the slide plate 6 must likewise in turn ensue counter the said pressure point and the said bending stress.

It can also be particularly well seen in FIG. 5 that the holding grip 32 is fashioned as a step offset in downward direction from the under edge of the frame structure 2, whereby the offset step 36 is preferably beveled. The lower edge of the angled profile of the transverse web 20 may be seen at the right next to the holding grip 32.

FIG. 7, finally, shows a collecting bowl 40 that, as a consequence of the holding grip design of the invention for the device, can be employed especially well together with said device 1. In its upper edge region, the collecting bowl 40 comprises symmetrically arranged recesses 42 and 44. These are optionally envisioned for the through-engagement for the transverse web 20 of the device 1 and are correspondingly dimensioned. Due to the engagement of the transverse web 20 through one of the recesses 42 or 44, it becomes possible given the holding grip design of the invention to hold the collecting bowl 40 and the device 1 firmly together with one hand. The edge regions 46 preferably have their long ends bevelled to the same degree as the offset step 36 of the holding grip 32 in order to assure an optimally form-fitted seating of the device 1 on the collecting bowl 40.

By way of addition, let it also be mentioned that the collecting bowl 40, of course, serves the purpose of collecting the material cut with the device 1. Finally, a detent 26 for the back end of the edges of the slide plate 6 proceeding parallel to the framing ledges 2 is provided immediately following this guide projection 24.

Both individually as well as in arbitrary combinations, the features of the invention disclosed in the above specification, in the drawings as well as in the claims can be critical for the realization of the various embodiments of the invention.

I claim:

1. A device for cutting fruit, vegetables or the like into slices, comprising a blade-holding plate at whose leading edge a V-shaped cutter blade is arranged, comprising two framing ledges arranged essentially parallel that are connected to one another by the blade-holding plate and by at least one further web, and comprising a slide plate guided at the framing ledges and introducible parallel to the blade-holding plate, whereby a narrow gap remains between the adjacent portions of the slide plate and the cutter blade, characterized in that a support plate (11) is further provided that is fashioned as a closed surface and is to be positioned under said slide plate (6) and said slide plate includes a substantially V-shaped trailing edge adapted to be positioned adjacent and in substantially congruent relation to the V-shaped cutter blade, and said support plate being secured to said framing ledges, of a shape similar to the slide plate and arranged to engage and support the slide plate so that the slide plate is positioned between the support plate and the V-shaped cutter blade, wherein structure associated with each of the framing ledges and the support plate supports the slide plate, and slide plate locking means are provided in association with each of said framing ledges and said slide plate for securing said slide plate in position relative to cutter blade;

whereby said slide plate is introduced between the ledges in a plane substantially parallel to a plane of the cutter blade, is supported, and is secured in position relative to the cutter blade by urging the plate toward the cutter blade, said urging causing the locking means associated with the framing ledges and slide plate to interlock and position the slide plate relative to the cutter blade.

2. A device as in claim 1, wherein there is further provided a pair of guide ledges, each associated with one of said framing ledges for engaging and supporting said slide plate.

3. A device as in claim 2, wherein said slide plate locking means associated with each of said framing ledges is formed as a notch within each of said guide ledges.

4. A device as in claim 3, wherein there is further provided a pair of guide detents (26), each associated with one of the framing ledges adjacent the cutter blade and with the framing ledge for engaging a portion of the slide plate when said slide plate is in the locked position.

5. A device as in claim 4, wherein said guide ledge extends toward the cutter blade and terminates adjacent each of the guide detents.

6. A device as in claim 5, wherein each of said guide detents is spaced from said guide ledge a distance less than a thickness of said slide plate.

7. A device as in claim 6, wherein there is further provided a pair of stop members each associated with one of said framing ledges and positioned rearwardly of said guide detents for stopping the movement of the slide plate toward the cutter blade and for cooperation with the slide plate locking means for positioning the slide plate relative to said cutter blade.

8. A device as in claim 1, characterized in that said slide plate (6) comprises at least one centrally arranged longitudinal rib at its underside, said longitudinal rib lying against said support plate (11).

9. A device as in claim 1, characterized in that said slide plate (6) comprises at least one centrally arranged longitudinal rib at its underside, said longitudinal rib constructed to rest against said support plate (11).

10. A device according to claim 1, characterized in that said slide plate (6) has appropriate noses as its underside engaging into notches (16) that are fashioned in guide ledges (22) adjoining said framing ledges (2) and said support plate (11) and in that a projection (24) for guiding said slide plate is arranged at at least one framing ledge (2) immediately following a back end of said guide ledges (22), and being arranged such above a plane of said slide plate (6) that said slide plate (6) is placed under a bending stress due to the guidance of said projection (24) and simultaneously lifting in a front part of said slide plate due to said noses as its underside gliding onto a front region (28) of each guide ledge (22), said bending stress in turn easing after said noses at said underside engages into said notches (16).

11. A device as in claim 1, characterized in that a guide groove (13) for said centrally arranged longitudinal rib is provided at the cutter blade end of said support plate (11).

12. A device as in claim 1, characterized in that the cuter blade end of said support plate (11) is supported on an angled profile (14) attached to said framing ledges (2) and to the underside of said blade-holding plate (3).

13. A device as in claim 1, characterized in that a transverse web (20) residing perpendicularly on the underside of said support plate (11) is arranged at said underside of said support plate, said transverse web extending from one frame side to the other.

14. A device as in claim 13, characterized in that a holding grip (32) in the form of a downwardly offset step is arranged at a front end of the frame for supporting the ball of a hand grasping the device.

15. A device as in claim 14, characterized in that said holding grip (32) comprises a gripping depression (34) at its top side.

16. A device as in claim 15, characterized in that said griping depression (34) is essentially symmetrically fashioned and is centrally arranged in said holding grip (32).

17. A device as in claim 14, characterized in that said transverse web (20) is arranged at a distance from said holding grip (32) that is ergonomically meaningful for the fingers of the hand grasping the device.

18. A device as in claim 17, characterized in that said transverse web (20) is fashioned in the form of an angled profile having three or four corrugations.

19. A device as in claim 18, characterized in that said slide plate (6) is provided with a gripping edge (30) at its front end.

* * * * *